United States Patent [19]

Mizuno et al.

[11] Patent Number: 5,018,958
[45] Date of Patent: May 28, 1991

[54] MOLD FOR SKIN COVERED FOAMED PLASTIC MOLDING

[75] Inventors: Hisayoshi Mizuno; Masami Mori, both of Ayase, Japan

[73] Assignee: Ikeda Bussan Co., Ltd., Kanagawa, Japan

[21] Appl. No.: 329,577

[22] Filed: Mar. 28, 1989

[30] Foreign Application Priority Data

Sep. 30, 1987 [JP] Japan .............................. 62-149757[U]

[51] Int. Cl.5 ..................... B29C 39/10; B29C 39/24
[52] U.S. Cl. ..................... 425/117; 249/91; 249/105; 264/46.4; 425/817 R
[58] Field of Search ............ 425/4 R, 817 R, 543, 425/559, 560, 579, 110, 117; 264/46.4, 46.6, 46.8, 45.3, 46.9, 46.5, 46.7; 249/83, 105, 91, 93, 95

[56] References Cited

U.S. PATENT DOCUMENTS

| 4,240,999 | 12/1980 | Decker | 425/817 R |
| 4,618,466 | 10/1986 | McGlashen et al. | 264/328.2 |
| 4,824,070 | 4/1989 | Mizuno et al. | 264/46.4 |

FOREIGN PATENT DOCUMENTS

| 1505110 | 12/1967 | France | 264/46.4 |
| 59-189890 | 10/1984 | Japan | 264/46.6 |
| 60-49905 | 3/1985 | Japan | 264/46.6 |
| 62-263012 | 11/1987 | Japan | 264/46.4 |
| 63-1512 | 1/1988 | Japan | 264/46.7 |

Primary Examiner—Jay H. Woo
Assistant Examiner—James P. Mackey
Attorney, Agent, or Firm—Weiser & Stapler

[57] ABSTRACT

A mold for skin covered foamed plastic molding capable of preventing penetration of the liquid foam resin to be poured on a skin cover without manual operation of target plate or use of double side adhesive tapes, and also capable of improving the efficiency of manufacturing process. The mold includes an element removably attached on the upper mold below the injection hole, for receiving the liquid foam resin before the liquid foam resin falls on the skin cover.

4 Claims, 2 Drawing Sheets

MOLD FOR SKIN COVERED FOAMED PLASTIC MOLDING

BACKGROUND OF THE INVENTION

1. Field of the Invention

The present invention relates to a mold for foamed plastic molding suitable for molding foamed plastic articles such as to be used for car seat cushions and seat backs in conjunction with skin covers.

2. Description of the Background Art

The skin covered foamed plastic has been used for car seat cushions, car seat backs, and car seat head rests. A mold for manufacturing such a skin covered foamed plastic comprises a pair of an upper mold and a lower mold.

In manufacturing with such a mold, a skin cover is placed on top of an inner surface of the lower mold over which liquid foam resin is poured in, and with the upper mold placed on top of the lower mold the liquid foam resin is foamed and stiffened to become the pad and at the same time combining of the skin cover and the pad is achieved.

Now, when pouring the liquid foam resin, care must be taken to avoid the penetration of the liquid foam resin through the skin cover. This has conventionally been done by providing a target plate which the liquid foam resin is going to hit first so that the liquid foam resin does not fall intensively on any single portion of the skin cover, or by attaching double side adhesive tapes on the skin cover.

However, the use of the target plate calls for manual operation by an operator which suppresses the efficiency of the manufacturing process. Also, the use of the double side adhesive tapes requires cumbersome taping work and, in addition, differences in stiffness and touch can be caused at location of the double side adhesive tapes.

SUMMARY OF THE INVENTION

It is therefore an object of the present invention to provide a mold for skin covered foamed plastic molding capable of preventing penetration of the liquid foam resin to be poured on a skin cover without manual operation of the target plate or use of double side adhesive tapes, and also capable of improving the efficiency of the manufacturing process.

This object of the present invention is achieved by providing a mold for skin covered foamed plastic molding, comprising: a lower mold having a molding surface, where a skin cover is to be placed over the molding surface, and where liquid foam resin is to be poured onto the skin cover; an upper mold to be closed over the lower mold, having an injection hole through which the liquid foam resin is to be poured in; and means, removably attached on the upper mold below the injection hole, for receiving the liquid foam resin before the liquid foam resin falls on the skin cover.

Other features and the advantages of the present invention will become apparent from the following description taken in conjunction with the accompanying drawings.

DETAILED DESCRIPTION OF THE PREFERRED EMBODIMENTS

Figure 1:
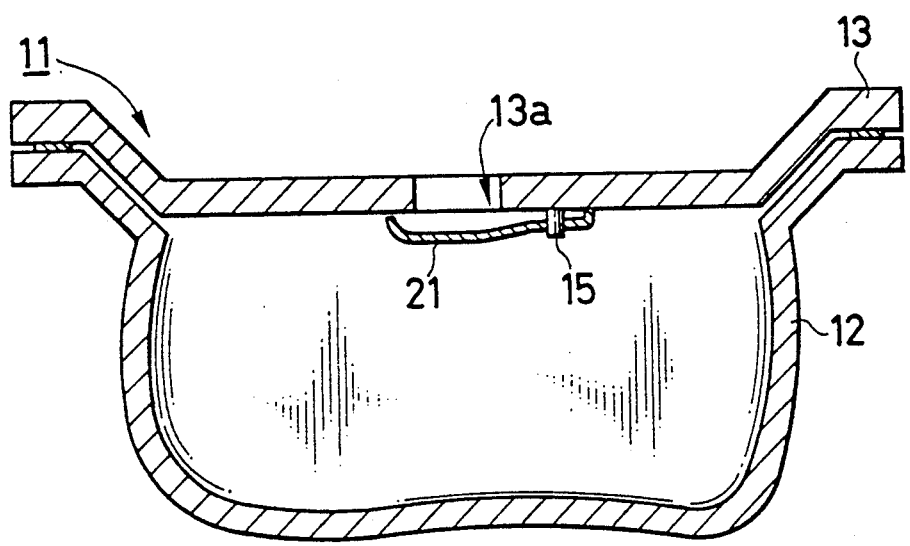
FIG. 1 is a cross sectional view of one embodiment of a mold for skin covered foamed plastic molding according to the present invention.

Referring now to FIG. 1, there is shown one embodiment of a mold for skin covered foamed plastic molding according to the present invention.

In this embodiment, a mold 11 comprises a lower mold 12 and an upper mold 13 to be placed over the lower mold 12. The upper mold 13 has a liquid foam resin injection hole 13a, and on a bottom side of the upper mold 13 facing toward the lower mold 12, a pair of holder members 15 is fixed in the vicinity of the injection hole 13a by means of which a penetration prevention plate 21 is detachably held below the injection hole 13a.

Figure 2:
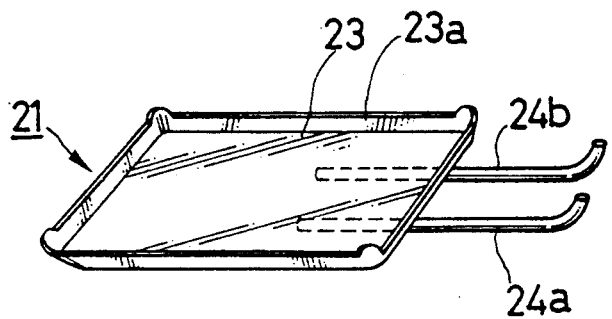
FIG. 2 is a perspective view of a penetration prevention plate to be utilized in the mold for skin covered foamed plastic molding of FIG. 1.
Figure 3:
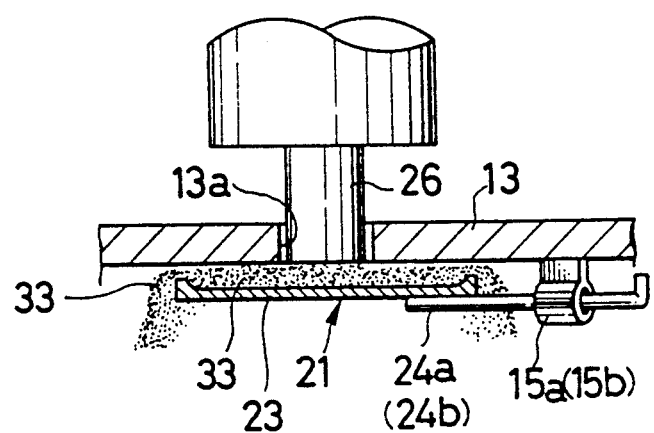
FIG. 3 is a partial magnified cross sectional view of the mold for skin covered foamed plastic molding of FIG. 1 showing detail configuration of the penetration prevention plate of FIG. 2 and holder members holding it.

As shown in FIG. 2, this penetration prevention plate 21 comprises a plate member 23 with upturned brim 23a and a pair of handle members 24a and 24b fixed on a bottom side of the plate member 23. As shown in FIG. 3, each one of the handle members 24a and 24b is held by one of the holder members 15 each of which has a pair of pinching members 15a and 15b for coactingly grasping the handle members 24a and 24b. Thus, the plate member 23 of the penetration prevention plate 21 receives liquid foam resin 33 poured from a nozzle 26 thrusted into the injection hole 13a before the liquid foam resin falls further down.

Figure 4:
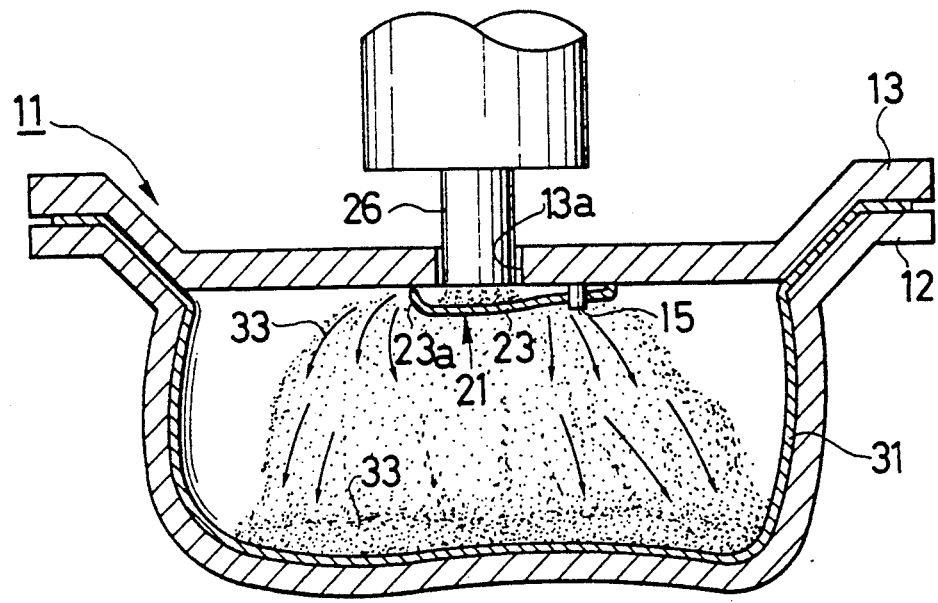
FIG. 4 is another cross sectional view of the mold for skin covered foamed plastic molding of FIG. 1 for explaining a molding process using this mold.

Referring now to FIG. 4, the molding process using this mold 11 will be explained.

First, a skin cover 31 is placed over a molding surface of the lower mold 12. Then, the upper mold 13 is placed in a predetermined mutual position.

Next, the liquid foam resin 33 is poured in from the nozzle 26 thrusted into the injection hole 13a. Because of the penetration prevention plate 21 below the injection hole 13a, the poured liquid foam resin 33 falls on the plate member 23 of the penetration prevention plate 21 first. As a result, the liquid foam resin 33 is temporarily detained on the plate member 23 inside the upturned brim 23a, and then flows out of the plate member 23, while undergoing foaming process. Consequently, the pressure exerted by the liquid foam resin 33 falling from the plate member 23 on the skin cover 31 is much reduced by the time the liquid foam resin 33 finally falls on the skin cover 31.

Finally, after the foaming process of the liquid foam resin 33 is completed, the upper mold 13 is opened, so that a skin covered foamed plastic article composed of the skin cover 31 and the fully foamed foam resin can be lifted out of the lower mold 12.

The penetration prevention plate 21 may be detached from the holder members 15 and removed from the upper mold 13 either before or after the skin covered foamed plastic article is taken out.

It is to be noted that the shapes and the sizes of the penetration prevention plate 21 and the holding members 15 may be suitably modified in various ways.

As explained, according to this embodiment, it is possible to provide a mold for skin covered foamed plastic molding capable of preventing penetration of the liquid foam resin to be poured on a skin cover without manual operation of a target plate or use of double side adhesive tapes, and also capable of improving the efficiency of the manufacturing process, because the pressure exerted by the liquid foam resin 33 falling on the skin cover 31 is much reduced by the penetration prevention plate 21 which temporarily detains the liquid foam resin 33 from further fall, which not only scatters and slows down the liquid foam resin 33 but also provides time for the foaming process to progress before the liquid foam resin falls on the skin cover 31.

It is to be pointed out that apart from those mentioned above, many modifications and variations of the above embodiment may be made without departing from the novel and advantageous features of the present invention. Accordingly, all such modifications and variations are intended to be incorporated within the scope of the appended claims.

What is claimed is:

1. A mold for skin covered foamed plastic molding, comprising:

a lower mold having a molding surface onto which a skin cover is to be placed, so that a liquid foam resin can be poured onto the skin cover;

an upper mold to be closed over the lower mold and having an injection hole through which the liquid foam resin is to be poured; and means, attached on the upper mold below the injection hole, for reducing pressure exerted on the skin cover due to fall of the liquid foam resin by receiving and temporarily detaining the liquid foam resin before the liquid foam resin falls onto the skin cover.

2. The mold of claim 1, wherein the receiving means comprises holder members fixed on a bottom side of the upper mold, and a plate member detachably held below the injection hole by the holder members.

3. The mold of claim 2, wherein the plate member has an upturned brim such that the liquid foam resin poured on the receiving means is temporarily detained on the plate member inside the upturned brim before falling further down onto the skin cover.

4. The mold of claim 1, wherein the means for receiving the liquid foam resin is removably attached on the upper mold.

* * * * *